United States Patent [19]

Cullen et al.

[11] Patent Number: 5,058,488

[45] Date of Patent: Oct. 22, 1991

[54] MEANS FOR PREVENTING THE BUILD-UP OF CARBON DEPOSITS ON PISTONS

[75] Inventors: Joao A. Cullen, Ann Arbor, Mich.; Miguel N. D. Azevedo, Osasco, Brazil

[73] Assignee: Metal Leve S.A., San Paolo, Brazil

[21] Appl. No.: 423,117

[22] Filed: Oct. 19, 1989

[30] Foreign Application Priority Data

Oct. 26, 1988 [BR] Brazil .......................... PI8805718[U]

[51] Int. Cl.[5] .................................................. F16J 1/04

[52] U.S. Cl. ........................................ 92/208; 92/261; 123/193 P; 277/24; 277/182; 277/195; 277/216

[58] Field of Search .......................... 92/208, 192, 261; 277/195, 197, 216, 217, 218, 219, 220, 24; 123/193 P, 197 A

[56] References Cited

U.S. PATENT DOCUMENTS

| | | | |
|---|---|---|---|
| 1,301,438 | 4/1919 | Higley | 277/195 |
| 1,313,784 | 8/1919 | Blauveut | 277/195 |
| 1,446,076 | 2/1923 | Waterman | 277/197 |
| 1,529,052 | 3/1925 | Anderson | 277/195 |
| 1,539,050 | 5/1925 | McChesney | 277/195 |
| 1,699,454 | 1/1929 | Starr | 277/195 |
| 1,790,767 | 2/1931 | Ricardo | 277/24 |
| 2,212,042 | 8/1940 | Phillips et al. | 277/195 |
| 2,465,896 | 3/1949 | Marien | 277/195 |
| 2,589,106 | 3/1952 | Marien | 277/195 |
| 3,124,362 | 3/1964 | Davis | 277/24 |
| 3,893,675 | 7/1975 | Geffroy | 277/195 |
| 3,901,131 | 8/1975 | Prasse | 92/182 |
| 4,313,368 | 2/1982 | Promeyrat | 277/24 |
| 4,317,174 | 1/1983 | Gürtler | 277/24 |
| 4,475,739 | 10/1984 | Nakajima et al. | 277/216 |
| 4,516,480 | 5/1985 | Cattaneo | 92/182 |
| 4,592,559 | 6/1986 | Harvey | 277/216 |

FOREIGN PATENT DOCUMENTS

| | | | |
|---|---|---|---|
| 2515767 | 5/1983 | France | 277/216 |
| 8904932 | 6/1989 | PCT Int'l Appl. | 277/216 |
| 314095 | 2/1952 | Switzerland | 277/216 |

*Primary Examiner*—Edward K. Look
*Assistant Examiner*—Thomas Denion
*Attorney, Agent, or Firm*—Darby & Darby

[57] ABSTRACT

A substantially circumferential annular member is installed in the region defined by the rear face of a piston compression ring and the upper and lower walls and the bottom of the compression ring groove. The annular member moves within said room by the action of inertia forces arising out of the piston reciprocating motion, thereby preventing the build-up of carbon particles in the piston compression ring groove.

8 Claims, 1 Drawing Sheet

MEANS FOR PREVENTING THE BUILD-UP OF CARBON DEPOSITS ON PISTONS

BACKGROUND OF THE INVENTION

The present invention relates to an improvement on pistons for internal combustion engines which are susceptible to the undesirable build-up of carbon deposits, particularly on the walls and bottom of the compression ring grooves.

The build-up of carbon deposits on these portions of the compression ring grooves is very common owing mainly to the incomplete fuel burn at the upper region of the cylinder liner and/or to the carbonization of lubricating oil caused by high combustion temperatures.

The carbon that builds up on said areas is a complex composition which sticks at first to the piston on its top portion, or to the cylinder liner, then passes to the piston ring band and enters the compression ring grooves through the clearances between the groove walls and the faces of the rings. Tiny carbon particles adhere gradually to the bottom of the ring grooves and are subsequently densified by piston pounding force applied to the carbon by the rear face of the compression rings resulting from the piston secondary lateral motions.

This is a highly undesirable process, for the carbon deposit, as it increases substantially, urges the compression rings towards the cylinder wall, causing the shearing of the lubricating oil film between the cylinder and the ring front face. Thus, the resulting friction generates an abrasive action between said surfaces causing damages to the engine.

Only a few solutions for overcoming this problem have been proposed to this date. One well-known solution contemplates the mounting of the compression rings in a slant position in relation to the compression ring groove walls, the front face of these rings closer to the piston upper portion. This configuration prevents carbon from building up in the grooves as it eliminates the clearance between the compression ring upper face and the groove upper wall through which the carbon residues usually enter. However, this design causes an increase in lubricating oil consumption.

OBJECT OF THE INVENTION

It is, therefore, the principal object of the present invention to provide a piston for internal combustion engines with an additional member designed to prevent the build-up of carbon deposits in the compression ring grooves.

BRIEF DESCRIPTION OF THE INVENTION

Particularly, according to the present invention such pistons are provided with an additional member, generally an annular and substantially continuous member, placed in the region defined between the rear face of the compression ring, the upper and lower wall and the bottom of the compression ring.

Said member, with suitable dimensions, effects movements within the said region and under inertial forces transmitted to it at every reciprocating travel of the piston. Moreover, the piston transverse translation in the cylinder effects an additional rotary motion. The combined action of these movements in the said room causes a crumbling action that prevent the carbon particles from densifying and building up the undesirable deposits. For this purpose, the object of the present invention may be represented by many configurations.

BRIEF DESCRIPTION OF THE DRAWINGS

The present invention will be better appreciated from the following description with reference to the accompanying, drawings, where.

DETAILED DESCRIPTION OF THE INVENTION

Figure 1:
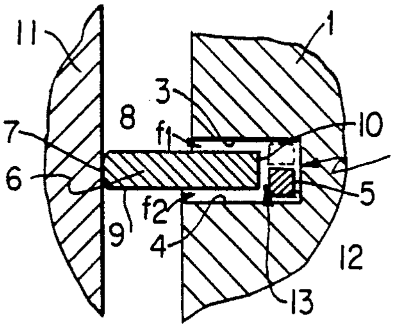
FIG. 1 is a longitudinal section view of the portion of the piston, significantly enlarged, illustrating one embodiment of the present invention.

In one preferred embodiment, represented in FIG. 1, the piston is provided with at least one compression ring groove 2 defined by its upper wall 3, lower wall 4 and bottom 5. The piston 1 accommodates at least one compression ring 6 defined by its front face 7, upper face 8, lower face 9 and rear face 10. Between the upper face 8 of the compression ring 6 and the upper wall 3 of compression ring groove 2 there is a clearance $f_1$, and between the lower face 9 of the compression ring 6 and the lower wall 4 of the compression ring groove 2 there is a clearance $f_2$, both clearances being generally larger than zero.

Immediately after the build-up of carbon particles on the top portion of the cylinder 11, or piston 1, at the time of the combustion, said particles fall toward the engine crankcase (not shown) and a portion of said particles infiltrates into the compression ring groove 2, mainly through clearance $f_1$, and seats on the piston bottom 5 and lower wall 4 and becomes stuck to said regions due to the pounding force applied by the rear face 10 of the compression ring 6 arising out of the secondary lateral movements of piston 1. The annular member 12, having a rectangular cross section, is preferably of steel, and its smallest dimension is at least greater than the clearance $f_1$, and clearance $f_2$, therefore the member 12 is confined within the room defined by the lower wall 4, the bottom 5, the upper wall 3 of the groove 2, and the front face 10 of the compression ring 6. Due to the location of the annular member 12, behind compression ring 6, the carbon from the top portion of cylinder liner 11 is prevented from depositing on region 13, as the annular member 12 displaces rapidly and many times from the lower wall 4 to the upper wall 5, scraping the four faces 10, 4, 5, 3 that define the region 13, by means of poundings caused by the action of inertia forces transmitted at every change in direction of the piston 1 during its reciprocating motion in the cylinder 11, thereby crumbling and spalling said carbon particles.

Figure 3A:
FIGS. 3A–3E show some exemplary configurations of the cross section of the annular member of the invention illustrated in FIGS. 1 and 2.
Figure 3B:
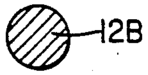
Figure 3C:
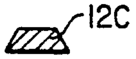
Figure 3D:
Figure 3E:
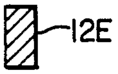

FIGS. 3A–3E show other forms of the annular member 12. In FIG. 3A member 12A is square, in FIG. 3B member 12B is circular, in FIG. 3C member 12C is trapezoidal, in FIG. 3D member 12D is hexagonal, and in FIG. 3E member 12E is rectangular.

Figure 2:
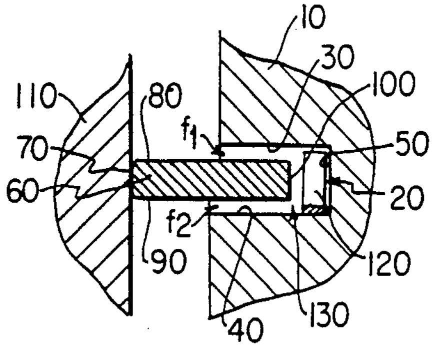
FIG. 2 is an enlarged longitudinal sectional view of the piston portion showing a second embodiment of the present invention.

In another embodiment of the present invention represented in FIG. 2, the piston 10 is provided with the annular member 120, made of an alloy similar to that used for making the compression ring 60. Also in this embodiment the annular member 120 is confined within the region 130, defined by the lower wall 40, the bottom 50, the upper wall 30 of the groove 20 of the compression ring 60 and the rear face 100 of compression ring 60. The carbon from the upper portion of cylinder 110 or from the top portion of piston 10 is prevented from depositing on region 130 for the sinuous annular member 120 moves forcefully and scrapes the four faces 100, 40, 50, 30 that define room 130. Due to its contour, the sinuous member 120 operates by constant vibration caused by the action of inertia forces transmitted by piston 10 at every change of direction of the reciprocating motion of the piston 10 in cylinder 110, which causes the carbon particles to crumble and spall.

Figure 2A:
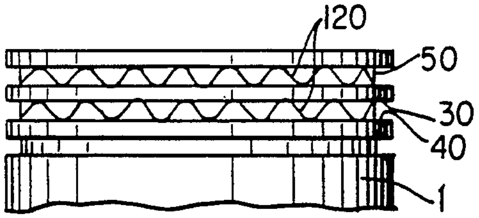
FIG. 2*a* is a front elevation view of the piston portion of FIG. 2 depicting the longitudinal section of the annular member of the invention.
Figure 4A:
FIGS. 4A–4C depict some exemplary configurations of the longitudinal section of the sinuous annular member of the present invention illustrated in the preceding Figures.
Figure 4B:
Figure 4C:

In FIG. 2A the sinuous annular member 12D is generally sinusoidal, as is also shown in FIG. 4A; in FIG. 4D it is triangular; and in FIG. 4C there are upper and lower connected sinuous U-shaped sections formed by a straight piece.

Obviously, the choice for a geometric shape as well as the material for the annular member will depend on particular needs of a given design. Therefore, said shape and material may be other than those described and illustrated herein, which are intended to be exemplary only.

One important advantage from the use of the object of the invention is the maintenance of a lubricating oil film on the cylinder wall due to the prevention of the shearing action by the compression rings, which in the prior art are urged against the cylinder wall by the build-up of carbon particles in the ring grooves.

Thus, the presence of a permanent oil film to prevent a piston-to-cylinder wall contact provides a longer service life of the engine. Another advantage of the invention is that the action of the annular member is self-adjusting, i.e., the higher the engine speed, the higher the crumbling action of the annular member.

We claim:

1. A carbon build-up prevention means for a piston of an internal combustion engine having a compression ring groove in the outer wall thereof, the ring groove having an upper and lower and a rear wall and a compression ring in the compression groove at its rear wall, the buildup prevention means comprising an annular ring having a profile along the piston longitudinal axis which alternates around its circumference in up and down directions relative to the upper and lower walls of the compression ring groove, the distance of the height between the extremities of the annular ring profile being less than the distance between the compression ring groove upper and lower walls and the annular ring inner surface normally being spaced from the outer face of the compression ring, movement of and force applied on the piston moving the annular ring and causing it to be displaced so that the extremities of its profile engage the compression ring groove walls.

2. The means of claim 1, wherein said annular ring has a sinuous longitudinal profile.

3. The means of claim 1 wherein the annular ring profile has triangular shaped alternations.

4. The means of claim 1 wherein the annular ring profile has connected alternating sinuous shaped and straight sections.

5. The means of claim 1 wherein the front face of the annular ring extends out of the compression ring groove to be able to engage the wall of the cylinder in which the piston is to be reciprocated.

6. The means of claim 5 wherein said annular ring has a sinuous longitudinal profile.

7. The means of claim 5 wherein the annular ring profile has triangular shaped alternations.

8. The means of claim 5 wherein the annular ring profile has connected alternating sinuous shaped and straight sections.

* * * * *

UNITED STATES PATENT AND TRADEMARK OFFICE
CERTIFICATE OF CORRECTION

PATENT NO. : 5,058,488

DATED : October 22, 1991

INVENTOR(S) : Joao A. Cullen et al.

It is certified that error appears in the above-identified patent and that said Letters Patent is hereby corrected as shown below:

In the title page of the patent, please delete "Assignee: Metal Leve S.A." and substitute therefor --Assignee: Metal Leve S.A. Industria e Comercio--.

Signed and Sealed this

Sixteenth Day of March, 1993

*Attest:*

STEPHEN G. KUNIN

*Attesting Officer*

*Acting Commissioner of Patents and Trademarks*